United States Patent
McCaffrey et al.

(10) Patent No.: US 8,943,133 B2
(45) Date of Patent: Jan. 27, 2015

(54) FRIEND RECOMMENDATION SYSTEM FOR A COMPUTER-IMPLEMENTED GAME

(75) Inventors: Daniel McCaffrey, San Bruno, CA (US); Kevin A. Lee, San Francisco, CA (US); Kenneth Rudin, Palo Alto, CA (US); Yan Zhang, Foster City, CA (US); Ananda Ghosh, Oakland, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

(21) Appl. No.: 13/244,840

(22) Filed: Sep. 26, 2011

(65) Prior Publication Data

US 2013/0005477 A1    Jan. 3, 2013

Related U.S. Application Data

(63) Continuation of application No. 13/218,885, filed on Aug. 26, 2011.

(60) Provisional application No. 61/503,593, filed on Jun. 30, 2011.

(51) Int. Cl.
*G06F 15/16* (2006.01)
*A63F 13/40* (2014.01)
*H04L 12/58* (2006.01)
*A63F 13/30* (2014.01)
*G06Q 50/00* (2012.01)

(52) U.S. Cl.
CPC .............. *A63F 13/10* (2013.01); *G06Q 50/01* (2013.01); *H04L 51/32* (2013.01); *A63F 13/12* (2013.01); *A63F 2300/535* (2013.01); *A63F 2300/556* (2013.01)
USPC .............................. 709/204; 463/42; 709/206

(58) Field of Classification Search
CPC ......... H04L 51/32; G06Q 50/01; A63F 13/12
USPC ................. 709/204–206, 217, 220; 705/319, 705/14.19, 14.53; 707/9, 3, 769; 463/29, 463/42; 706/11; 715/753
See application file for complete search history.

(56) References Cited

U.S. PATENT DOCUMENTS

| 7,454,420 | B2 | 11/2008 | Ray et al. |
|---|---|---|---|
| 7,454,470 | B1 | 11/2008 | Isaacs et al. |
| 7,644,144 | B1 | 1/2010 | Horvitz et al. |
| 7,801,971 | B1 | 9/2010 | Amidon et al. |
| 7,908,647 | B1 | 3/2011 | Polis et al. |
| 7,997,987 | B2 | 8/2011 | Johnson et al. |

(Continued)

OTHER PUBLICATIONS

U.S. Appl. No. 13/244,846, Non Final Office Action mailed Dec. 23, 2011, 10 pgs.

(Continued)

*Primary Examiner* — Jungwon Chang
(74) *Attorney, Agent, or Firm* — Schwegman Lundberg & Woessner, P.A.

(57) ABSTRACT

Social network information of a player of a computer-implemented game is accessed to analyze a social interaction of the player with other players from the social network information to recommend other players of the social network of the player to further communicate with. A recommendation of other players is generated to the player based on a frequency of the social interaction. A selection of players from the recommendation is received from the player. A communication message is generated to the selected players.

13 Claims, 12 Drawing Sheets

(56) References Cited

U.S. PATENT DOCUMENTS

| | | | |
|---|---|---|---|
| 8,230,036 B2* | 7/2012 | Ishikawa et al. | 709/217 |
| 8,292,713 B2 | 10/2012 | Reynolds et al. | |
| 8,356,057 B2 | 1/2013 | Greenshpan et al. | |
| 8,392,335 B2 | 3/2013 | Waingold | |
| 8,502,651 B2 | 8/2013 | Birnbaum | |
| 2002/0116466 A1 | 8/2002 | Trevithick et al. | |
| 2005/0159970 A1 | 7/2005 | Buyukkokten et al. | |
| 2005/0171955 A1 | 8/2005 | Hull et al. | |
| 2005/0203929 A1 | 9/2005 | Hazarika et al. | |
| 2007/0173324 A1 | 7/2007 | Multerer et al. | |
| 2008/0086431 A1 | 4/2008 | Robinson et al. | |
| 2008/0134053 A1 | 6/2008 | Fischer | |
| 2008/0243853 A1 | 10/2008 | Reding | |
| 2009/0075738 A1 | 3/2009 | Pearce | |
| 2009/0077026 A1* | 3/2009 | Yanagihara | 707/3 |
| 2009/0175264 A1 | 7/2009 | Reitalu et al. | |
| 2009/0183226 A1 | 7/2009 | Dean et al. | |
| 2009/0197681 A1* | 8/2009 | Krishnamoorthy et al. | 463/42 |
| 2009/0217178 A1* | 8/2009 | Niyogi et al. | 715/753 |
| 2009/0276284 A1 | 11/2009 | Yost | |
| 2010/0005099 A1* | 1/2010 | Goodman et al. | 707/9 |
| 2010/0057858 A1 | 3/2010 | Shen et al. | |
| 2010/0179961 A1* | 7/2010 | Berry et al. | 707/769 |
| 2010/0262658 A1* | 10/2010 | Mesnage | 709/204 |
| 2010/0312724 A1* | 12/2010 | Pinckney et al. | 706/11 |
| 2011/0055132 A1 | 3/2011 | Mahdian et al. | |
| 2011/0131145 A1 | 6/2011 | Soza et al. | |
| 2011/0153423 A1* | 6/2011 | Elvekrog et al. | 705/14.53 |
| 2011/0165945 A1 | 7/2011 | Dickins | |
| 2011/0202400 A1* | 8/2011 | Bedard et al. | 705/14.19 |
| 2011/0208814 A1 | 8/2011 | Bostrom et al. | |
| 2011/0208822 A1 | 8/2011 | Rathod | |
| 2011/0212769 A1* | 9/2011 | Carroll et al. | 463/29 |
| 2011/0225102 A1* | 9/2011 | Schleier-Smith | 705/319 |
| 2011/0231529 A1* | 9/2011 | Yates et al. | 709/220 |
| 2011/0238755 A1* | 9/2011 | Khan et al. | 709/204 |
| 2012/0094762 A1 | 4/2012 | Khan | |
| 2012/0290565 A1 | 11/2012 | Wana et al. | |
| 2012/0302351 A1 | 11/2012 | Murphy et al. | |
| 2013/0005478 A1 | 1/2013 | Mccaffery et al. | |
| 2013/0005479 A1 | 1/2013 | Mccaffery et al. | |
| 2013/0041862 A1 | 2/2013 | Yang et al. | |
| 2013/0054479 A1 | 2/2013 | Ross et al. | |

OTHER PUBLICATIONS

U.S. Appl. No. 13/244,851, Response filed Jan. 16, 2012 to Non Final Office Action mailed Dec. 5, 2011, 14 pgs.

U.S. Appl. No. 13/244,851, Examiner Interview Summary mailed Dec. 29, 2011, 5 pgs.

U.S. Appl. No. 13/244,851, Final Office Action mailed Feb. 24, 2012, 21 pgs.

U.S. Appl. No. 13/244,851, Non Final Office Action mailed Dec. 5, 2011, 20 pgs.

McCaffery, Daniel, et al., "Friend Recommendation System Based on an Active Social Network", U.S. Appl. No. 13/244,846, filed Sep. 26, 2011, 68 pgs.

"U.S. Appl. No. 13/244,846, Final Office Action mailed Jan. 16, 2013", 12 pgs.

"U.S. Appl. No. 13/244,846, Non Final Office Action mailed Aug. 29, 2012", 10 pgs.

"U.S. Appl. No. 13/244,846, Response filed Dec. 31, 2012 to Non Final Office Action mailed Aug. 31, 2012", 11 pgs.

"U.S. Appl. No. 13/244,846, Advisory Action mailed Aug. 2, 2012", 3 pgs.

"U.S. Appl. No. 13/244,846, Examiner Interview Summary mailed Aug. 2, 2012", 3 pgs.

"U.S. Appl. No. 13/244,846, Final Office Action mailed Jun. 13, 2012", 9 pgs.

"U.S. Appl. No. 13/244,846, Response filed Jul. 30, 2012 to Final Office Action mailed Jun. 13, 2012", 12 pgs.

"U.S. Appl. No. 13/244,851, Response filed May 23, 2012 to Final Office Action mailed Feb. 24, 2012", 9 pgs.

"U.S. Appl. No. 13/244,846, Response filed Mar. 23, 2012 to Non Final Office Action mailed Dec. 23, 2011", 12 pgs.

"U.S. Appl. No. 13/218,885, Final Office Action mailed Aug. 15, 2013", 17 pgs.

"U.S. Appl. No. 13/218,885, Non Final Office Action mailed Mar. 26, 2013", 14 pgs.

"U.S. Appl. No. 13/218,885, Response filed Jun. 18, 2013 to Non Final Office Action mailed Mar. 26, 2013", 12 pgs.

"U.S. Appl. No. 13/244,846, Non Final Office Action mailed Oct. 3, 2013", 14 pgs.

"U.S. Appl. No. 13/244,846, Response filed Jun. 17, 2013 to Final Office Action mailed Jan. 16, 2013", 12 pgs.

"U.S. Appl. No. 13/218,885, Non Final Office Action mailed Jul. 17, 2014", 22 pgs.

"U.S. Appl. No. 13/218,885, Response filed Feb. 17, 2014 to Final Office Action dated Aug. 15, 2013", 17 pgs.

"U.S. Appl. No. 13/244,846, Final Office Action mailed Mar. 28, 2014", 15 pgs.

"U.S. Appl. No. 13/244,846, Notice of Allowance mailed Oct. 7, 2014", 21 pgs.

"U.S. Appl. No. 13/244,846, Response filed Mar. 3, 2014 to Final Office Action dated Oct. 3, 2013", 14 pgs.

"U.S. Appl. No. 13/244,846, Response filed Aug. 28, 2014 to Final Office Action dated Mar. 28, 2014", 18 pgs.

"U.S. Appl. No. 13/244,851, Notice of Allowance mailed May 15, 2014", 15 pgs.

"U.S. Appl. No. 13/244,851, Notice of Allowance mailed Sep. 19, 2014", 8 pgs.

"U.S. Appl. No. 13/244,851, Supplemental Notice of Allowability mailed Jul. 8, 2014", 5 pgs.

* cited by examiner

FRIEND RECOMMENDATION SYSTEM FOR A COMPUTER-IMPLEMENTED GAME

RELATED APPLICATIONS

This application is a continuation of U.S. application Ser. No. 13/218,885 filed Aug. 26, 2011, which claims priority from provisional U.S. Patent Application Ser. No. 61/503,593, filed Jun. 30, 2011, the entire contents of which are incorporated herein by reference.

TECHNICAL FIELD

The present disclosure generally relates to games and applications and, in example embodiments, to computer-implemented, online social games.

BACKGROUND

Online social games are becoming widespread. The success of an online social game depends on the number of players and how often these players visit the online social game. As such, the retention of online players to visiting the online social games is an important factor towards the success of the online social games.

BRIEF DESCRIPTION OF THE DRAWINGS

The present disclosure is illustrated by way of example, and not by way of limitation, in the figures of the accompanying drawings in which.

DETAILED DESCRIPTION

Figure 1:
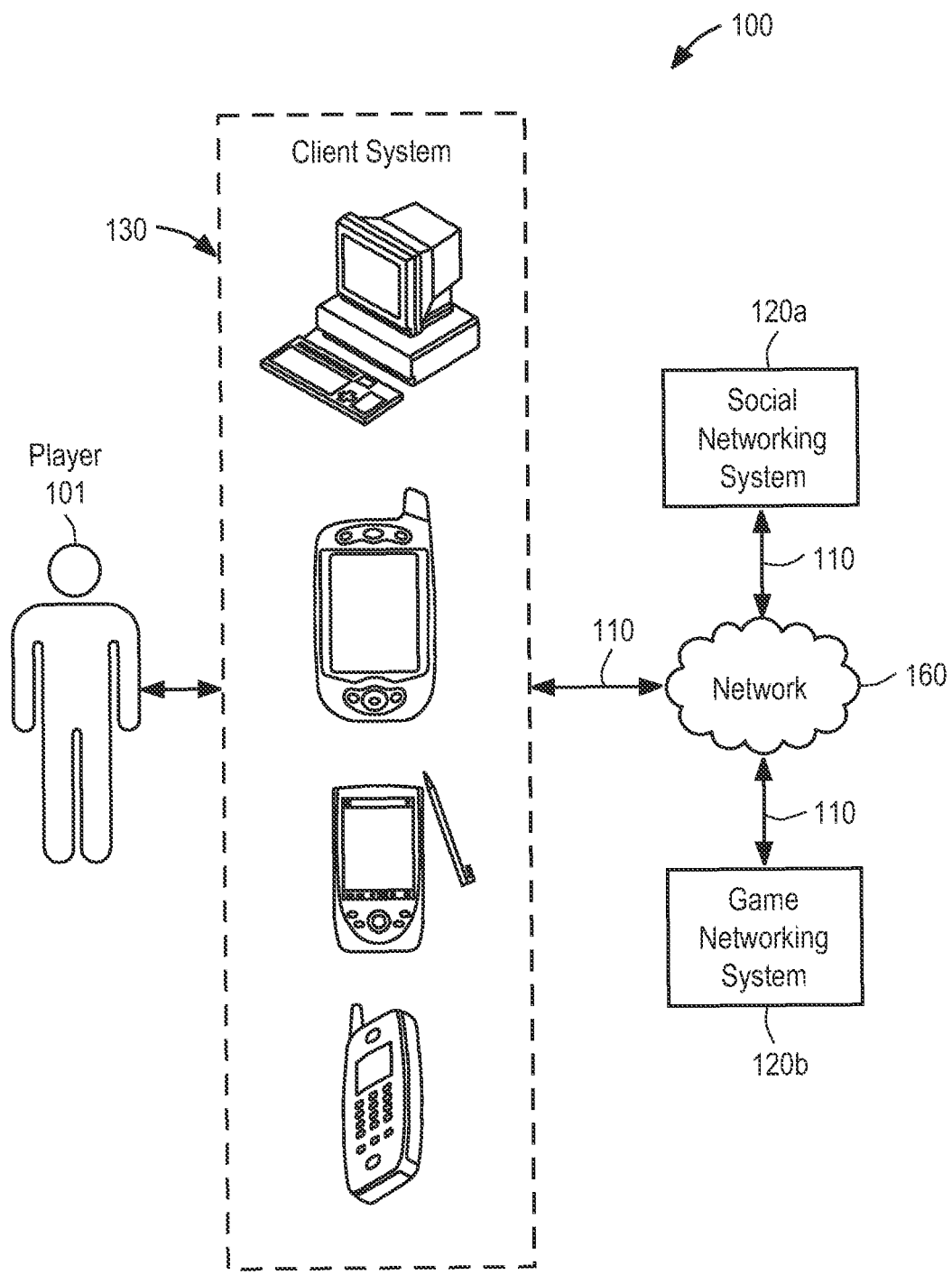
FIG. 1 illustrates an example of a system for implementing example disclosed embodiments.

Although the present disclosure has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense.

An enhanced, for example optimized, friend recommendation system is described. An ASN of a player is determined based on a frequency of reciprocated communications between the player and friends of the player. The ASN of the player has friends of the player with a minimum predefined number of closed-loop communications with the player within a predetermined duration. The social network of friends outside the ASN of the player is identified. One or more friends with whom the player may socially engage in an online game are identified and suggested based on the social network of friends of the player outside the ASN of the player. In one embodiment, a closed-loop communication includes a first user sending a message to a second user and the second user replying to the message to the first user. The social network of friends outside the ASN of the player is identified. One or more friends with whom the player my socially engage in an online game are identified and suggested based on the social network of friends of the player outside the ASN of the player. In one embodiment, social engagements may include social actions that enable a player to connect with another user within the context of the online game. For example, the social engagement may include sending a virtual gift in an online game, requesting that another user join the player on a specific mission in the online game, requesting another player to help the player in the online game, and so forth.

In one embodiment, the ASN of the player is identified by determining reciprocated communications between the player and respective friends of the player within the predetermined duration, defining the predetermined duration, determining a length of time elapsed from a last predetermined duration, and measuring a number of reciprocated communications between the player and respective friends of the player within the predetermined duration.

In one embodiment, the social network of friends outside the ASN of the player is identified by determining a non-ASN sender network of the player based on the ASN of the player. The non-ASN sender network comprises friends of the player that have sent an unreciprocated communication to the player within a predetermined amount of time.

In one embodiment, the non-ASN sender network is determined by identifying friends of the player who have sent an unreciprocated communication to the player within the predetermined amount of time, and by identifying friends of the player who were previously included in the ASN of the player and have sent an unreciprocated communication to the player within the predetermined amount of time.

In another embodiment, the social network of friends outside the ASN of the player is identified by determining anon-ASN clicker network of the player based on the ASN of the player. The non-ASN clicker network comprises friends of the player who have received an unreciprocated communication from the player within a predetermined amount of time.

In one embodiment, the non-ASN clicker network is determined by identifying friends of the player who have received an unreciprocated communication from the player within the predetermined amount of time, and identifying friends of the player who were previously included in the ASN of the player and have received an unreciprocated communication from the player within the predetermined amount of time.

In another embodiment, the social network of friends outside the ASN of the player is identified by determining a non-ASN of the player of the online game based on the ASN of the player of the online game. The non-ASN comprises friends of the player who have no communications with the player within a predetermined amount of time.

In one embodiment, the non-ASN is determined by identifying friends of the player who have no communications with the player within the predetermined amount of time, and identifying friends of the player who were previously included in the ASN of the player and have no communications with the player within the predetermined amount of time.

In one embodiment, one or more friends are identified and suggested for the player based on the ASN of the player, a non-ASN sender network of the player, a non-ASN clicker network of the player, and a non-ASN of the player.

In one embodiment, one or more friends are identified and suggested for the player on an online game based on the ASN of the player for the online game, a non-ASN sender network of the player for the online game, anon-ASN clicker network of the player for the online game, a prior ASN of the player for an online game, a prior non-ASN sender network of the player for the online game, and a prior non-ASN clicker network of the player for the online game.

In another embodiment, the ASN of the player is determined for a respective online game of the game networking system. A social network of players outside the ASN of the player of the respective online game of the game networking system is identified.

In another embodiment, the ASN of the player is determined for a respective online game of the game networking system. A social network of players outside the ASN of the player from other online games of the game networking system is identified.

Example Online Game Networking System

FIG. 1 illustrates an example of a system for implementing various disclosed embodiments. In particular embodiments, system 100 comprises player 101, social networking system 120a, game networking system 120b, client system 130, and network 160. The components of system 100 can be connected to each other in any suitable configuration, using any suitable type of connection. The components may be connected directly or over a network 160, which may be any suitable network. For example, one or more portions of network 160 may be an ad hoc network, an intranet, extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Social networking system 120a is a network-addressable computing system that can host one or more social graphs. Social networking system 120a can generate, store, receive, and transmit social networking data. Social networking system 120a can be accessed by the other components of system 100 either directly or via network 160. Game networking system 120b is a network-addressable computing system that can host one or more online games. Game networking system 120b can generate, store, receive, and transmit game-related data, such as, for example, game account data, game input, game state data, and game displays. Game networking system 120b can be accessed by the other components of system 100 either directly or via network 160. Player 101 may use client system 130 to access, send data to, and receive data from social networking system 120a and game networking system 120b. Client system 130 can access social networking system 120a or game networking system 1201) directly, via network 160, or via a third-party system. As an example and not by way of limitation, client system 130 may access game networking system 120b via social networking system 120a. Client system 130 can be any suitable computing device, such as a personal computer, laptop, cellular phone, smart phone, computing tablet, and the like.

Although FIG. 1 illustrates a particular number of players 101, social networking systems 120a, game networking systems 120b, client systems 130, and networks 160, this disclosure contemplates any suitable number of players 101, social networking systems 120a, game networking systems 120b, client systems 130, and networks 160. As an example and not by way of limitation, system 100 may include one or more game networking systems 120b and no social networking systems 120a. As another example and not by way of limitation, system 100 may include a system that comprises both social networking system 120a and game networking system 120b. Moreover, although FIG. 1 illustrates a particular arrangement of player 101, social networking system 120a, game networking system 120b, client system 130, and network 160, this disclosure contemplates any suitable arrangement of player 101, social networking system 120a, game networking system 120b, client system 130, and network 160.

The components of system 100 my be connected to each other using any suitable connections 110. For example, suitable connections 110 include wireline (such as, for example, Digital Subscriber Line (DSL) or Data Over Cable Service interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) connections. In particular embodiments, one or more connections 110 each include an ad hoc network, an intranet, an extranet, VPN, a LAN, a WEAN, a WAN, a WWAN, a MAN, a portion of the Internet, a portion of the PSTN, a cellular telephone network, or another type of connection, or a combination of two or more such connections. Connections 110 need not necessarily be the same throughout system 100. One or more first connections 110 may differ in one or more respects from one or more second connections 110. Although FIG. 1 illustrates particular connections between player 101, social networking system 120a, game networking system 120b, client system 130, and network 160, this disclosure contemplates any suitable connections between player 101, social networking system 120a, game networking system 120b, client system 130, and network 160. As an example and not by way of limitation, in particular embodiments, client system 130 may have a direct connection to social networking system 120a or game networking system 1201), bypassing network 160.

In an online computer game, a game engine manages the game state of the game. Game state comprises all game play parameters, including player character state, non-player character (NPC) state, in-game object state, game world state (e.g., internal game clocks, game environment), and other game play parameters. Each player 101 controls one or more player characters (PCs). The game engine controls all other aspects of the game, including non-player characters (NPCs), and in-game objects. The game engine also manages game state, including player character state for currently active (online) and inactive (offline) players.

An online game can be hosted by game networking system 120b, which can be accessed using any suitable connection with a suitable client system 130. A player may have a game account on game networking system 120b, wherein the game account can contain a variety of information associated with the player (e.g., the player's personal information, financial information, purchase history, player character state, game state). In some embodiments, a player may play multiple games on game networking system 120b, which may maintain a single game account for the player with respect to all the games, or multiple individual game accounts for each game with respect to the player. In some embodiments, game networking system 120b can assign a unique identifier to each player 101 of an online game hosted on game networking system 120b. Game networking system 120b can determine that a player 101 is accessing the online game by reading the user's cookies, which may be appended to HTTP requests transmitted by client system 130 and/or by the player 101 logging onto the online game.

In particular embodiments, player 101 may access an online game and control the game's progress via client system 130 (e.g., by inputting commands to the game at the client device). Client system 130 can display the game interface, receive inputs from player 101, transmit user inputs or other events to the game engine, and receive instructions from the game engine. The game engine can be executed on any suitable system (such as, for example, client system 130, social networking system 120a, or game networking system 120b). As an example and not by way of limitation, client system 130 can download client components of an online game, which are executed locally, while a remote game server, such as game networking system 120b, provides backend support for the client components and may be responsible for maintaining application data of the game, processing the inputs from the player, updating and/or synchronizing the game state based on the game logic and each input from the player, and transmitting instructions to client system 130. As another example and not by way of limitation, each time player 101 provides an input to the game through the client system 130 (such as, for example, by typing on the keyboard or clicking the mouse of client system 130), the client components of the game may transmit the player's input to game networking sys 120b.

Game Systems, Social Networks, and Social Graphs

In an online multiplayer game, players may control player characters (PCs), while a game engine controls non-player characters (NPCs) and game features and also manages player character state and game state and tracks the state for currently active (i.e., online) players and currently inactive (i.e., offline) players. A player character can have a set of attributes and a set of friends associated with the player character. As used herein, the term "player character state" can refer to any in-game characteristic of a player character, such as location, assets, levels, condition, health, status, inventory, skill set, name, orientation, affiliation, specialty, and so on. Player characters may be displayed as graphical avatars within a user interface of the game. In other implementations, no avatar or other graphical representation of the player character is displayed. Game state encompasses the notion of player character state and refers to any parameter value that characterizes the state of an in-game element, such as a non-player, character, a virtual object (such as a wall or castle), and the like. The game engine may use player character state to determine the outcome of game events, sometimes also considering set or random variables. Generally, a player character's probability of having a more favorable outcome is greater when the player character has a better state. For example, a healthier player character is less likely to die in a particular encounter relative to a weaker player character or non-player character. In some embodiments, the game engine can assign a unique client identifier to each player.

In particular embodiments, player 101 may access particular game instances of an online game. A game instance is copy of a specific game play area that is created during runtime. In particular embodiments, a game instance is a discrete game play area where one or more players 101 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible by specific players) or non-exclusive (i.e., accessible by any player). In particular embodiments, a game instance is populated by one or more player characters controlled by one or more players 101 and one or more in-game Objects controlled by the game engine. When accessing an online game, the game engine may allow player 101 to select a particular game instance to play from a plurality of game instances. Alternatively, the game engine may automatically select the game instance that player 101 will access. In particular embodiments, an online game comprises only one game instance that all players 101 of the online game can access.

In particular embodiments, a specific game instance may be associated with one or more specific players. A game instance is associated with a specific player when one or more game parameters of the game instance are associated with the specific player. As an example and not by way of limitation, a game instance associated with a first player may be named "First Player's Play Area." This game instance may be populated with the first player's PC and one or more in-game objects associated with the first player. In particular embodiments, a game instance associated with a specific player may only be accessible by that specific player. As an example and not by way of limitation, a first player may access a first game instance when playing an online game, and this first game instance may be inaccessible to all other players. In other embodiments, a game instance associated with a specific player may be accessible by one or more other players, either synchronously or asynchronously with the specific player's game play. As an example and not by way of limitation, a first player may be associated with a first game instance, but the first game instance may be accessed by all first-degree friends in the first player's social network. In particular embodiments, the game engine may create a specific game instance for a specific player when that player accesses the game. As an example and not by way of limitation, the game engine may create a first game instance when a first player initially accesses an online game, and that same game instance may be loaded each time the first player accesses the game. As another example and not by way of limitation, the game engine may create a new game instance each time a first player accesses an online game, wherein each game instance may be created randomly or selected from a set of predetermined game instances. In particular embodiments, the set of in-game actions available to a specific player may be different in a game instance that is associated with that player compared to a game instance that is not associated with that player. The set of in-game actions available to a specific player in a game instance associated with that player may be a subset, superset, or independent of the set of in-game actions available to that player in a game instance that is not associated with him. As an example and not by way of limitation, a first player may be associated with Blackacre Farm in an online farming game. The first player may be able to plant crops on Blackacre Farm. If the first player accesses game instance associated with another player, such as Whiteacre Farm, the game engine may not allow the first player to plant crops in that game instance. However, other in-game actions may be available to the first player, such as watering or fertilizing crops on Whiteacre Farm.

In particular embodiments, a game engine can interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In particular embodiments, a unique client identifier can be assigned to each user in the social graph. This disclosure assumes that at least one entity of a social graph is a player or player character in an online multiplayer game.

The minimum number of edges required to connect a player (or player character) to another user is considered the degree of separation between them. For example, where the player and the user are directly connected (one edge), they are deemed to be separated by one degree of separation. The user would be a so-called "first-degree friend" of the player. Where the player and the user are connected through one other user (two edges), they are deemed to be separated by two degrees of separation. This user would be a so-called "second-degree friend" of the player. Where the player and the user are connected through N edges (or N−1 other users), they are deemed to be separated by N degrees of separation. This user would be a so-called "Nth-degree friend." As used herein, the term "friend" means only first-degree friends, unless context suggests otherwise.

Within the social graph, each player (or player character) has a social network. A player's social network includes all users in the social graph within Nmax degrees of the player, where Nmax is the maximum degree of separation allowed by the system managing the social graph (such as, for example, social networking system 120a or game networking system 120b). In one embodiment, Nmax equals 1, such that the player's social network includes only first-degree friends. In another embodiment, Nmax is unlimited and the player's social network is coextensive with the social graph.

In particular embodiments, the social graph is managed by game networking system 120b, which is managed by the game operator. In other embodiments, the social graph is part of a social networking system 120a managed by a third-party (e.g., Facebook, Myspace). In yet other embodiments, player 101 has a social network on both game networking system 120b and social networking system 120a, wherein player 101 can have a social network on the game networking system 120b that is a subset, superset, or independent of the player's social network on social networking system 120a. In such combined systems, game network system 120b can maintain social graph information with edge type attributes that indicate whether a given friend is an "in-game friend," an "out-of-game friend," or both. The various embodiments disclosed herein are operable when the social graph is managed by social networking system 120a, game networking system 120b, or both.

Figure 2A:
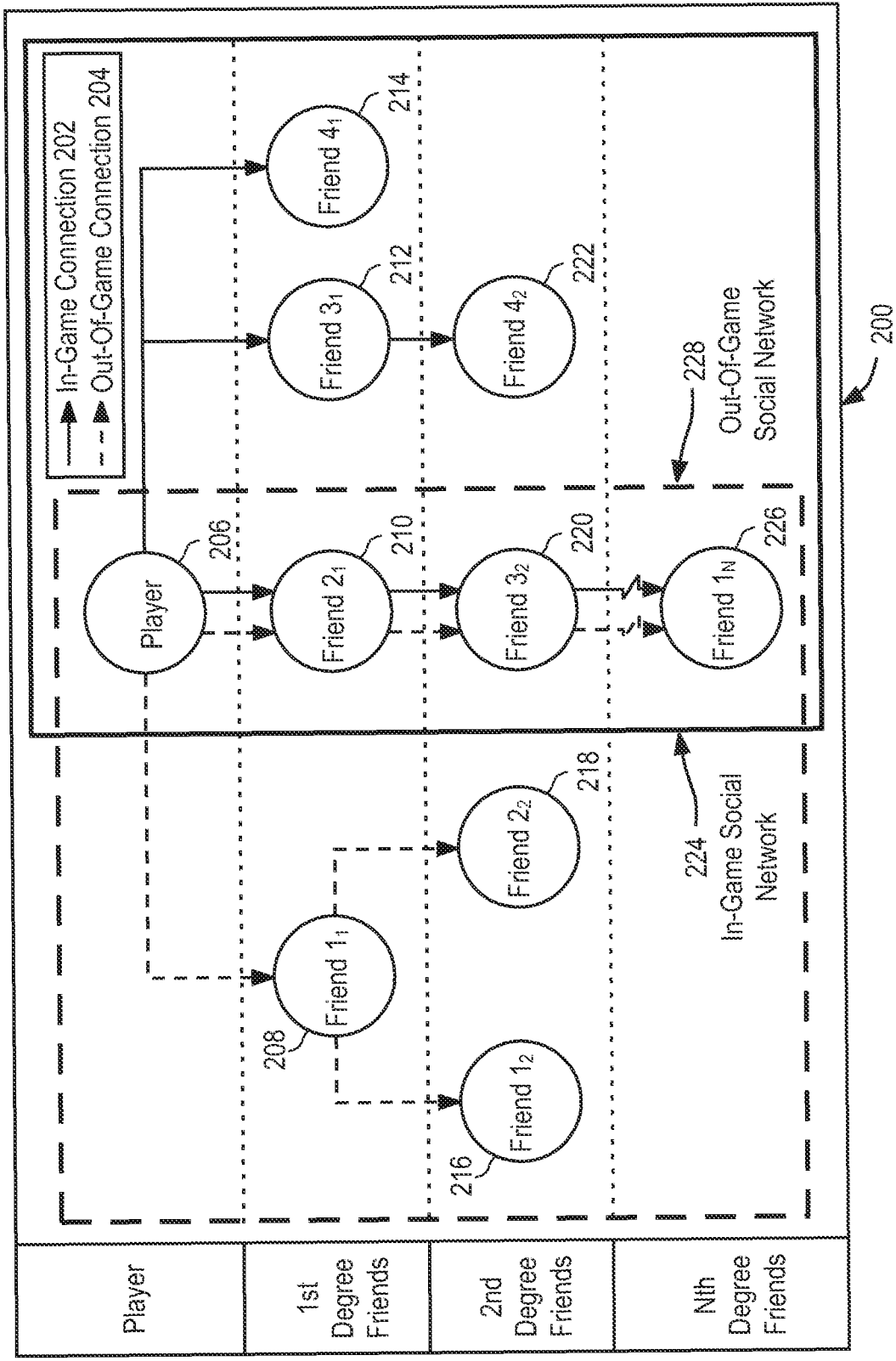
FIG. 2A illustrates an example social network.

FIG. 2A shows an example of a social network within a social graph. As shown, Player 206 can be associated, connected or linked to various other users, or "friends," within the social network 200. These associations, connections or links can track relationships between users within the social network 200 and are commonly referred to as online "friends" or "friendships" between users. Each friend or friendship in a particular user's social network within a social graph is commonly referred to as a "node." For purposes of illustration and not by way of limitation, the details of social network 200 will be described in relation to Player 206. As used herein, the terms "player" and "user" can be used interchangeably and can refer to any user or character in an online multiuser game system or social networking system. As used herein, the term "friend" can mean any node within a player's social network.

As shown in FIG. 2A, Player 206 has direct connections with several friends. When Player 206 has a direct connection with another individual that connection is referred to as a first-degree friend. In social network 200, Player 206 has two first-degree friends. That is, Player 206 is directly connected to Friend 208 and Friend 210. In a social graph, it is possible for individuals to be connected to other individuals through their first-degree friends (i.e., friends of friends). As described above, each edge required to connect a player to another user is considered the degree of separation. For example, FIG. 2A shows that Player 206 has three second-degree friends to which he is connected via his connection to his first-degree friends. Second-degree Friend 216 and Friend 218 are connected to Player 206 via his first-degree Friend 208. The limit on the depth of friend connections, or the number of degrees of separation for associations, that Player 206 is allowed is typically dictated by the restrictions and policies implemented by social networking system 120a.

In various embodiments, Player 206 can have Nth-degree friends connected to him through a chain of intermediary degree friends as indicated in FIG. 2A. For example, Nth-degree Friend 1N 226 is connected to Player 206 via second-degree Friend 220 and one or more other higher-degree friends. Various embodiments may take advantage of and utilize the distinction between the various degrees of friendship relative to Player 206.

In particular embodiments, a player (or player character) can have a social graph within an online multiplayer game that is maintained by the game engine and another social graph maintained by a separate social networking system. FIG. 2A depicts an example of in-game social network 224 and out-of-game social network 228. In this example, Player 206 has out-of-game connections 204 to a plurality of friends, forming out-of-game social network 228. Here, Friend 208 and Friend 210 are first-degree friends with Player 206 in his out-of-game social network 228. Player 206 also has in-game connections 202 to a plurality of players, forming in-game social network 224. Here, Friend 212 and Friend 214 are first-degree friends with Player 206 in his in-game social network 224. Friend 222 is a second-degree friend with Player 206 in his in-game social network 224. In some embodiments, it is possible for a friend to be in both the out-of-game social network 228 and the in-game social network 224. Here, Friend 210 has both an out-of-game connection 204 and an in-game connection 202 with Player 206, such that Friend 210 is in both Player 206's in-game social network 224 and Player 206's out-of-game social network 228.

As with other social networks, Player 206 can have second-degree and higher-degree friends in both his in-game and out of game social networks. In some embodiments, it is possible for Player 206 to have a friend connected to him both in his in-game and out-of-game social networks, wherein the friend is at different degrees of separation in each network. For example, if Friend 218 had a direct in-game connection with Player 206, Friend 218 would be a second-degree friend in Player 206's out-of-game social network, but a first-degree friend in Player 206's in-game social network. In particular embodiments, a game engine can access in-game social network 224, out-of-game social network 228, or both.

In particular embodiments, the connections in a player's in-game social network can be formed both explicitly (e.g., users must "friend" each other) and implicitly (e.g., system observes user behaviors and "friends" users to each other). Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (i.e., in disintermediated interactions or the like), but that could be the case.

Figure 2B:
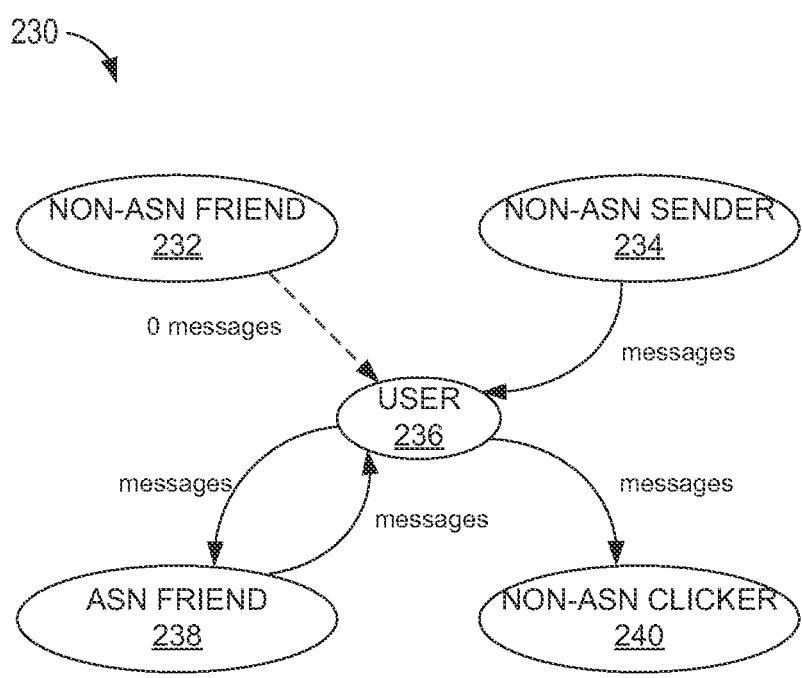
FIG. 2B illustrates an example social graph.

FIG. 2B illustrates an example social graph 230. In one embodiment, a user or player 236 includes a social network of friends that may also be players in the online game or in other games from an online gaming network. The ASN of the user to 236 comprises ASN friends 238. ASN friends are friends in the user's 236 social network with whom the user 236 has communicated via closed social interaction loops (e.g., visits, messages). In one embodiment, a message is defined as one user sending a message to another user within a duration window (for example, one week). In one embodiment, ASN duration represents a window of time that has at least one send-send relationship between users. An ASN recency represents how long ago the duration window was.

The message may include any social interaction message action initiated from a user to another user (for example, an e-mail related or unrelated to an online game of the gaming network, a text message, a chat message, a video message, and so forth).

The closed social interaction loop means that an ASN friend 238 has sent a message to the user 236. In response, the user 236 sends a message back to the ASN friend 238. Alternatively, the closed social interaction loop may also occur when the user 236 sends a message to an ASN friend 238. In response, the ASN friend 238 sends a message back to the user 236. In other words, the ASN of the user 236 includes people with whom the user 236 has had at least one closed social interaction loop, for example, in the last week. In another embodiment, the type of message sent from the user 236 or from an ASN friend 238 may have different weight in determining the closed social interaction loop for the ASN of the user 236. For example, a closed social interaction loop comprising a personal message written from a first player to a second player and a custom reply written from the second player to the first player may weight more than a closed social interaction loop with a template message from the first player to the second player wherein the second player clicked on a button in the received template message to reply. In other words, personalized messages written by a player may weight more towards determining the ASN of a player than standard template messages.

In another embodiment, communications between the players are analyzed and weight differently according to their impact. For example, some communications may be excluded while others may be included in the ASN analysis according to their expected social value.

Non-ASN clicker 240 includes users who are not in the ASN of the user 236, who have clicked (or opened) messages received from the user 236, and who have not closed the social interaction loop by replying back or sending a message back to the user 236 in response to a message from the user 236.

Non-ASN sender 234 includes users who are not in the ASN of the user 236, who have sent messages to the user 236, and who have not closed the social interaction loop because the user 236 has not replied to their messages. In one embodiment, the ASN duration and the ASN recency are respectively seven days.

Non-ASN friend 232 includes users that do not communicate (zero messages) with the user 236, but are included in the social network of the user 236 and may be active players of the game network system.

Figure 3:
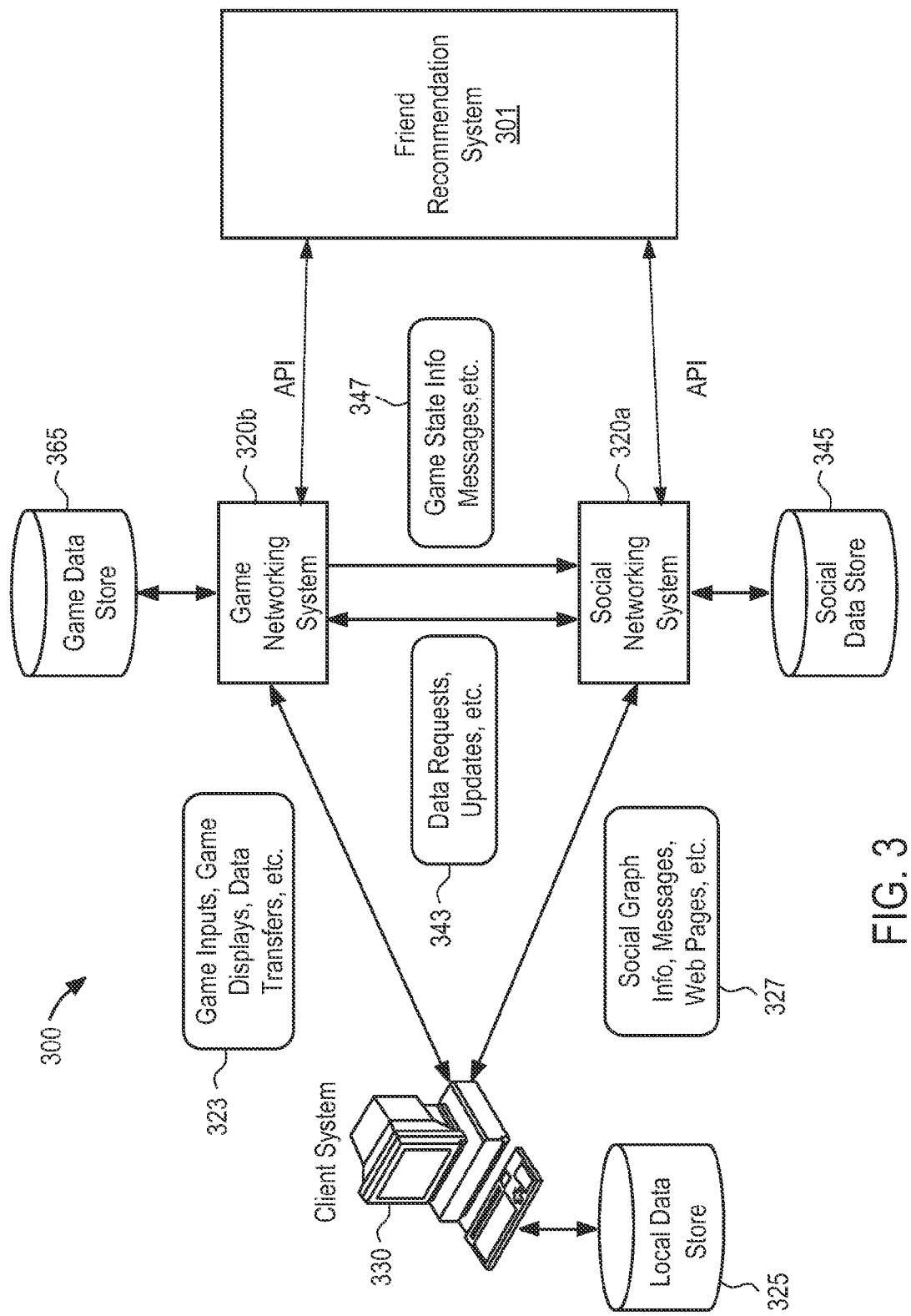
FIG. 3 illustrates an example data flow in a system.

FIG. 3 illustrates art example data flow between the components of a system 300. In particular embodiments, the system 300 can include a client system 330, a social networking system 320a, and a game networking system 320b. The components of the system 300 can be connected to each other in any suitable configuration, using any suitable type of connection. The components may be connected directly or over any suitable network. The client system 330, the social networking system 320a, and the game networking system 320b can each have one or more corresponding data stores such as local data store 325, social data store 345, and game data store 365, respectively. The social networking system 320a and the game networking system 320b can also have one or more servers that can communicate with the client system 330 over an appropriate network. The social networking system 320a and the game networking system 320b can have, for example, one or more internet servers for communicating with the client system 330 via the Internet. Similarly, the social networking system 320a and the game networking system 320b can have one or more mobile servers for communicating with the client system 330 via a mobile network (e.g., GSM, PCS, Wi-Fi, WPAN, etc.). In some embodiments, one server may be able to communicate with the client system 330 over both the Internet and a mobile network. In other embodiments, separate servers can be used.

The client system 330 can receive and transmit data 323 to and from the game networking system 320b. This data can include, for example, webpages, messages, game inputs, game displays, I-ITTP packets, data requests, transaction information, updates, and other suitable data. At some other time, or at the same time, the game networking system 320b can communicate data 347 (e.g., game state information, game system account information, page info, messages, data requests, updates, etc.) with other networking systems, such as the social networking system 320a (e.g., Facebook, Myspace, etc.). The client system 330 can also receive and transmit data 327 to and from the social networking system 320a. This data can include, for example, webpages, messages, social graph information, social network displays, HTTP packets, data requests, transaction information, updates, and other suitable data.

Communication between the client system 330, the social networking system 320a, and the game networking system 320b can occur over any appropriate electronic communication medium or network using any suitable communications protocols. For example, the client system 330, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols (such as HTTP), other communications protocols (such as HTITP-S, FTP, SNMP, TELNET), and a number of other protocols. In addition, a server in one interaction context may be a client in another interaction context. In particular embodiments, the information transmitted between hosts may be formatted as HyperText Markup Language (HTML) documents. Other structured document languages or formats can be used, such as XML and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called Binary Large Object (BLOB). When a player accesses an online game on the game networking system 320b, the BLOB containing the game state for the instance corresponding to the player can be transmitted to the client system 330 for use by a client-side executed object to process. In particular embodiments, the client-side executable may be a FLASH-based game, which can de-serialize the game state data in the BLOB. As a player plays the game, the game logic implemented at the client system 330 maintains and modifies the various game state parameters locally. The client-side game logic may also batch game events, such as mouse clicks, and transmit these events to the game networking system 320b. The game networking system 320b may itself operate by retrieving a copy of the BLOB from a database or an intermediate memory cache (memcache) layer. The game networking system 320b can also de-serialize the BLOB to resolve the game state parameters and execute its own game logic based on the events in the batch file of events transmitted by the client to synchronize the game state on the server side. The game networking system 320b may then re-serialize the game state, now modified, into a BLOB and pass this to a memory cache layer for lazy updates to a persistent database.

With a client-server environment in which the online games may run, one server system, such as the game networking system 320b, may support multiple client systems 330. At any given time, there may be multiple players at multiple client systems 330 all playing the same online game. In practice, the number of players playing the same game at the same time may be very large. As the game progresses with each player, multiple players may provide different inputs to the online game at their respective client systems 330, and multiple client systems 330 may transmit multiple player inputs and/or game events to game networking system 320b for further processing. In addition, multiple client systems 330 may transmit other types of application data to game networking system 320b.

In particular embodiments, a computer-implemented game may be a text-based or turn-based game implemented as a series of web pages that are generated after a player selects one or more actions to perform. The web pages may be displayed in a browser client executed on the client system 330. As an example and not by way of limitation, a client application downloaded to the client system 330 may operate to serve a set of web pages to a player. As another example and not by way of limitation, a computer-implemented game may be an animated or rendered game executable as a stand-alone application or within the context of a webpage or other structured document. In particular embodiments, the computer-implemented game may be implemented using Adobe Flash-based technologies. As an example and not by way of limitation, a game may be fully or partially implemented as a SWF object that is embedded in a web page and executable by a Flash media player plug-in. In particular embodiments, one or more described webpages may be associated with or accessed by the social networking system 320a. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (i.e., be updated) at any time. When an update to an application datum occurs at the client system 330, either caused by an action of a game player or by the game logic itself, the client system 330 may need to inform the game networking system 320b of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies. For illustration purposes and not by way of limitation, the system 300 is discussed in reference to updating a multi-player online game hosted on a network-addressable system (such as, for example, the social networking system 320a or the game networking system 320b), where an instance of the online game is executed remotely on the client system 330, which then transmits application event data to the hosting system such that the remote game server synchronizes game state associated with the instance executed by the client system 330.

In a particular embodiment, one or more objects of a game may be represented as an Adobe Flash object. Flash may manipulate vector and raster graphics and support bidirectional streaming of audio and video. "Flash" may mean the authoring environment, the player, or the application files. In particular embodiments, the client system 330 may include a Flash client. The Flash client may be configured to receive and run Flash application or game object code from any suitable networking system (such as, for example, the social networking system 320a or the game networking system 320b). In particular embodiments, the Flash client may be run in a browser client executed on the client system 330. A player can interact with Flash objects using the client system 330 and the Flash client. The Flash objects can represent a variety of in-game objects. Thus, the player may perform various in-game actions on various in-game objects by making various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization between the Flash object shown to the player at the client system 330, the Flash client may send the events that caused the game state changes to the in-game object to the game networking system 320b.

However, to expedite the processing and hence the speed of the overall gaming experience, the Flash client may collect a batch of some number of events or updates into a batch file. The number of events or updates may be determined by the Flash client dynamically or determined by game networking system 320b based on server loads or other factors. For example, the client system 330 may send a batch file to the game networking system 320b whenever several updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at the client system 330. In particular embodiments, the batch file may be a text file and the name-value pairs may be in string format.

In particular embodiments, when a player plays an online game on the client system 330, the game networking system 320b may serialize all the game-related data, including, for example and without limitation, game states, game events, user inputs, for this particular user and this particular game into a BLOB and stores the BLOB in a database. The BLOB may be associated with an identifier that indicates that the BLOB contains the serialized game-related data for a particular player and a particular online game. In particular embodiments, while a player is not playing the online game, the corresponding BLOB may be stored in the database. This enables a player to stop playing the game at any time without losing the current state of the game the player is in. When a player resumes playing the game next time, the game networking system 320b may retrieve the corresponding BLOB from the database to determine the most recent values of the game-related data. In particular embodiments, while a player is playing the online game, the game networking system 320b may also load the corresponding BLOB into a memory cache so that the game system may have faster access to the BLOB and the game-related data contained therein.

A friend recommendation system 301 communicates with the social networking system 320a and the game networking system 320b. An API may be provided to interface both social networking system 320a and the game networking system 320b with the friend recommendation system 301. The friend recommendation system 301 may be configured to analyze data including, for example, a frequency of reciprocated users' communications and interactions in social networking system 320a and the game networking system 320b in order to determine an ASN of a player. In another embodiment, the friend recommendation system 301 analyzes the communication of players from the game networking system 320b and/or the communication of friends from the social networking system 320a.

Based on the analysis of the data, the friend recommendation system 301 is able to generate a recommendation of one or more friends or users to socially engage with the player in an online game based on the social network of friends of the player outside the ASN of the player. In one embodiment, the friend recommendation system 301 identifies one or more friends of the player to whom the player may send a message, a virtual gift, or a request. For example, the player can request one or more suggested friends join in on an online mission in the online game. In another example, the player can send virtual gifts to one or more suggested friends in an online game.

A game event may be an outcome of an engagement, a provision of access, rights and/or benefits, or the obtaining of some assets (e.g., health, money, strength, inventory, land, etc.). A game engine determines the outcome of a game event according to a variety of factors, such as the game rules, a player character's in-game actions, player character state, game state, interactions of other player characters, and random calculations. Engagements can include simple tasks (e.g., plant a crop, clean a stove), complex tasks (e.g., build a farm or business, run a café), or other events.

An online game can be hosted by the game networking system 320b, which can be accessed over any suitable network with an appropriate client system 330. A player may have a game system account on a game system of the game networking system 320b, wherein the game system account can contain a variety of information about the player (e.g., the player's personal information, player character state, game state, etc.). In various embodiments, an online game can be embedded into a third-party website. The game can be hosted by the networking system of the third-party website, or it can be hosted on the game system 321 and merely accessed via the third-party website. The embedded online game can be hosted solely on a server of the game system 321 or using a third-party vendor server. In addition, any combination of the functions of the present disclosure can be hosted on or provided from any number of distributed network resources. For example, one or more executable code objects that implement all or a portion of the game can be downloaded to a client system for execution.

Figure 4:
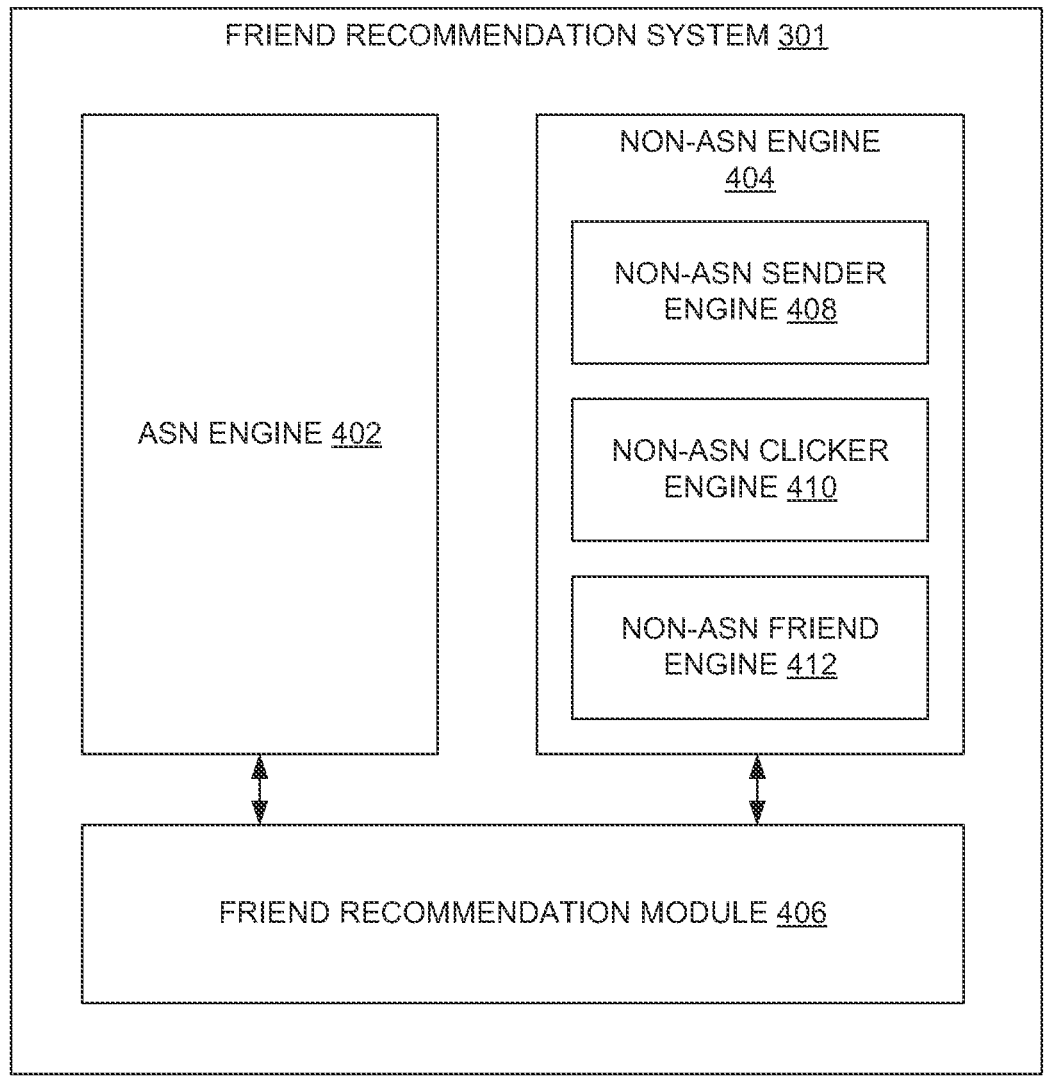
FIG. 4 illustrates one embodiment of a friend recommendation system.

FIG. 4 illustrates one embodiment of the friend recommendation system 301. The friend recommendation system 301 comprises an ASN engine 402, a non-ASN engine 404, and a friend recommendation module 406.

The ASN engine 402 determines the ASN of a player of an online game based on the game state information of players and the social state information of friends of the player. The ASN comprises friends of the player having a minimum predefined number of closed-loop communications with the player within a predetermined duration. In other words, the ASN of the player of the online game is based on a frequency of a reciprocated communication with other friends within a predefined duration. For example, the ASN of the player includes friends with whom the player has had at least one closed loop communication within the last one week. The closed loop communication may include a reciprocated communication between the player and another player/friend. The reciprocated communication may include a message sent from the player to another player and a message reply from the other player to the player within the predefined duration. For example, another player who replied back to the player after the predefined duration of seven days would not be part of the ASN of the player. The ASN engine 402 is further described below with respect to FIG. 5.

The non-ASN engine 404 determines identifies a social network of non-ASN friends of the player outside the ASN of the player. The non-ASN of the player includes friends of the player that are not included in the ASN of the player. In one embodiment, the non-ASN engine 404 includes a non-ASN sender engine 408, a non-ASN clicker engine 410, and a non-ASN friend engine 412. The engines 408, 410, and 412 are further described below with respect to FIGS. 6, 7, and 8.

A friend recommendation module 406 identifies and suggests one or more non-ASN friends with whom the player can socially engage in an online game based on the social network of friends of the player outside the ASN of the player. The following is an example of an implementation of the friend recommendation module 406:

In one embodiment, the Friend Recommendation algorithm in the friend recommendation module 406 selects a maximum number of users (e.g., 60 users) filled in the following order per user, to be used in a MFS (multi-friend selector drop down window):

1. ASN for the game
2. Non-ASN Senders for the game
3. Non-ASN Clickers for the game
4. 2 week Prior ASN (people not in the ASN now but they were 1 week ago).
5. 2 week Prior Non-ASN Senders (people not in the Non-ASN Senders now but they were 1 week ago).
6. 3 week Prior ASN (people not in the ASN now but they were 1 week ago).
7. 3 week Prior Non-ASN Senders (people not in the Non-ASN Senders now but they were 1 week ago).
8. 4 week Prior ASN (people not in the ASN now but they were 1 week ago).
9. 4 week Prior Non-ASN Senders (people not in the Non-ASN Senders now but they were 1 week ago).
10. Friends playing game and engaged at least two times in the last week.

Those of ordinary skills in the art will recognize that other variations from the above example order can also be generated by the Friend Recommendation module 406.

Figure 5:
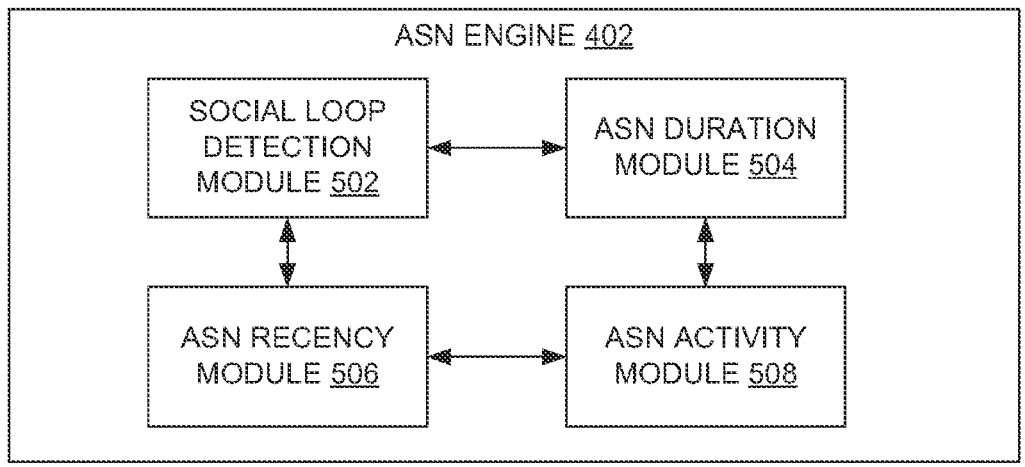
FIG. 5 illustrates one embodiment of an Active Social Network (ASN) engine.

FIG. 5 illustrates one embodiment of the ASN engine 402. The ASN engine 402 includes, for example, a social loop detection module 502, an ASN duration module 504, an ASN recency module 506, and an ASN activity module 508.

The social loop detection module 502 determines reciprocated communications between the player and respective friends of the player within the predetermined duration. In other words, the social loop detection module 502 detects closed loop communications between a player and another friend.

The ASN duration module 504 defines the predetermined duration. In one embodiment, the predetermined duration includes a window of time where at least one closed loop communication between the player and another user occurs within the window of time. The window of time may be, for example, seven days.

The ASN recency module 506 determines a length of time elapsed from a last predetermined duration. In one embodiment, the ASN recency module 506 determines how long ago the duration window was.

The ASN activity module 508 measures a number of reciprocated communications between the player and respective friends of the player within the predetermined duration. For example, the ASN activity identifies a total activity count within the ASN of the player. One activity count includes, for example, a count of the closed loop communication (e.g., send-send).

Figure 6:
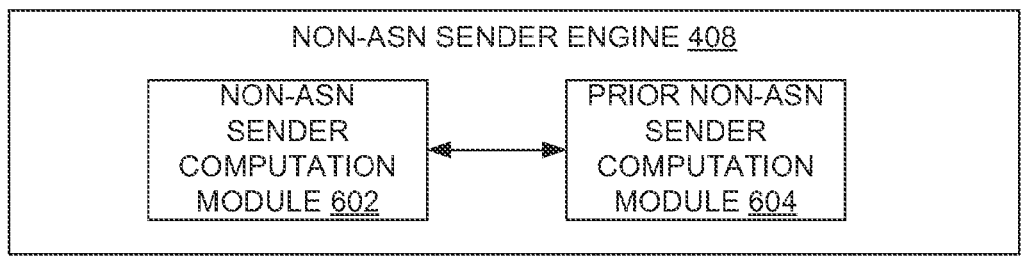
FIG. 6 illustrates one embodiment of a non-Active Social Network (ASN) sender engine.

FIG. 6 illustrates one embodiment of the non-ASN sender engine 408. In one embodiment, the non-ASN sender engine 408 determines a non-ASN sender network of the player based on the ASN of the player. The non-ASN sender network can include friends of the player who have sent an unreciprocated communication to the player within a predetermined amount of time.

In one embodiment, the non-ASN sender engine 408 includes a non-ASN sender computation module 602 and a prior non-ASN sender computation module 604. The non-ASN sender computation module 602 determines friends of the player who have sent one or more messages to the player but have not received a reply back from the player within the predetermined amount of time (e.g., seven days). The prior non-ASN sender computation module 604 identifies friends of the player who were previously included in the ASN of the player (and are not currently in the ASN of the player) and have sent an unreciprocated communication to the player within the predetermined amount of time.

Figure 7:
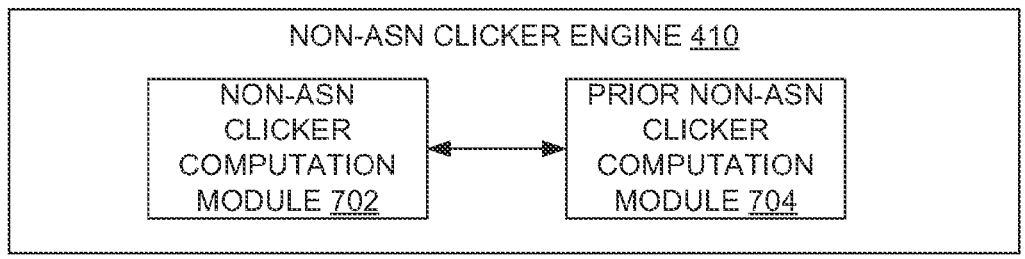
FIG. 7 illustrates one embodiment of a non-Active Social Network (ASN) clicker engine.

FIG. 7 illustrates one embodiment of the non-ASN clicker engine 410. The non-ASN clicker engine 410 determines a non-ASN clicker network of the player based on the ASN of the player. The non-ASN clicker network can include friends of the player who have received an unreciprocated communication from the player within a predetermined amount of time.

In one embodiment, the non-ASN clicker engine 410 includes a non-ASN clicker computation module 702 and a prior non-ASN clicker computation module 704. The non-ASN clicker computation module 702 identifies friends of the player who have received an unreciprocated communication from the player within the predetermined amount of time. The prior non-ASN clicker computation module 704 identifies friends of the player who were previously included in the ASN of the player (and are not currently in the ASN of the player) and have received an unreciprocated communication from the player within the predetermined amount of time.

Figure 8:
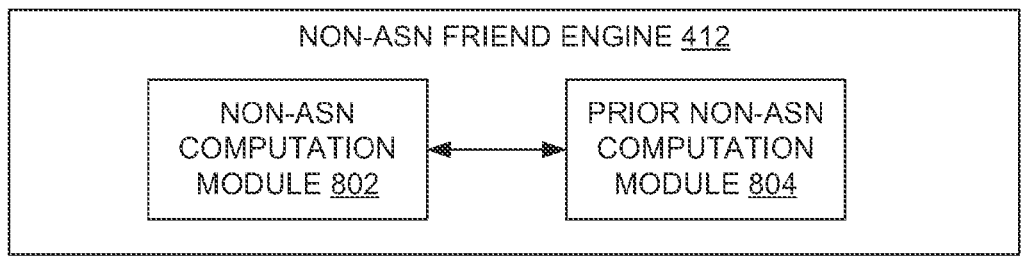
FIG. 8 illustrates one embodiment of a non-Active Social Network (ASN) friend engine.

FIG. 8 illustrates one embodiment of the non-ASN friend engine 412. The non-ASN friend engine 412 determines a non-ASN of the player of the online game based on the ASN of the player of the online game. The non-ASN can include friends of the player who have no communications with the player within a predetermined amount of time.

In one embodiment, the non-ASN friend engine 412 includes a non-ASN computation module 802 and a prior non-ASN computation module 804. The non-ASN computation module 802 identifies friends of the player who have no communications with the player within the predetermined amount of time. The prior non-ASN computation module 804 identifies friends of the player who were previously included in the ASN of the player (and are not currently in the ASN of the player) and have no communications with the player within the predetermined amount of time.

Figure 9:
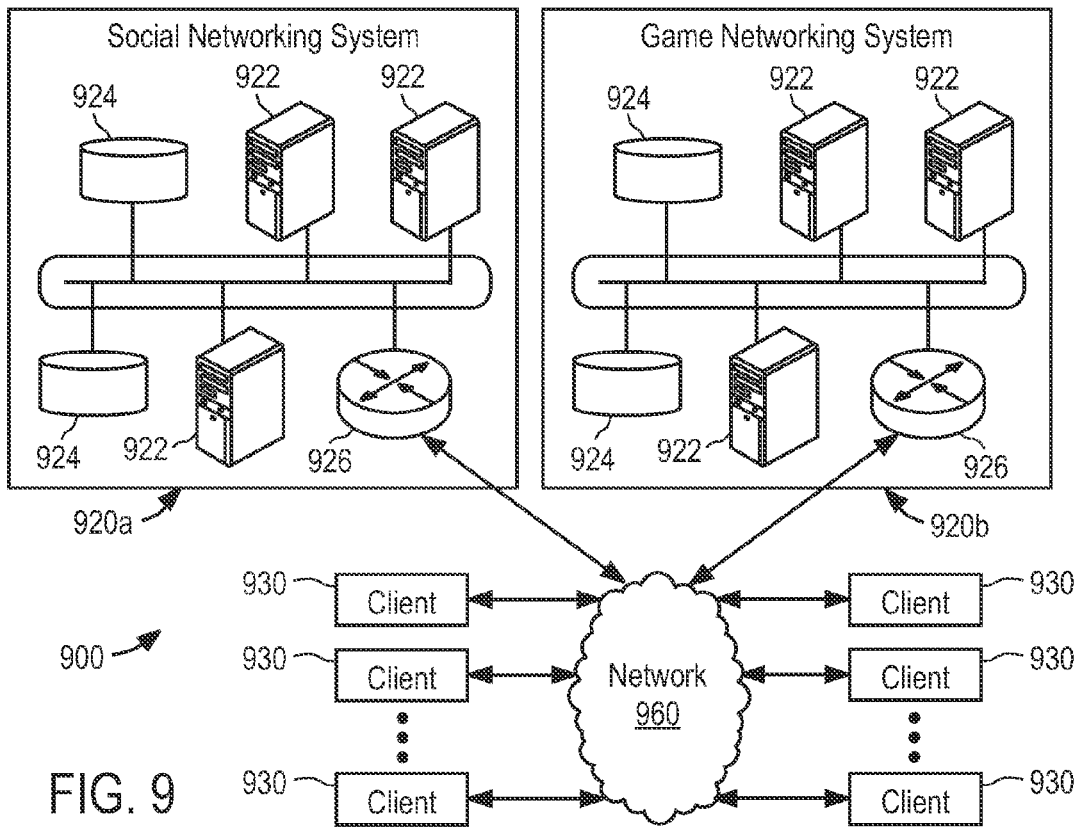
FIG. 9 illustrates an example network environment.

FIG. 9 illustrates an example network environment in which various example embodiments may operate. In particular embodiments, one or more described webpages may be associated with a networking system or networking service. However, alternate embodiments may have application to the retrieval and rendering of structured documents hosted by any type of network addressable resource or web site. Additionally, as used herein, a user may be an individual, a group, or an entity (such as a business or third party application).

Network cloud 960 generally represents one or more interconnected networks, over which the systems and hosts described herein can communicate. Network cloud 960 may include packet-based wide area networks (such as the Internet), private networks, wireless networks, satellite networks, cellular networks, paging networks, and the like. As FIG. 9 illustrates, particular embodiments may operate in a network environment comprising one or more networking systems, such as social networking system 920*a*, game networking system 920*b*, and one or more client systems 930. The components of social networking system 920*a* and game networking system 920*b* operate analogously; as such, hereinafter may be referred to simply at networking system 920. Client systems 930 are operably connected to the network environment via a network service provider, a wireless carrier, or any other suitable means.

Networking system 920 is a network addressable system that, in various example embodiments, comprises one or more physical servers 922 and data stores 924. The one or more physical servers 922 are operably connected to network cloud 960 via, by way of example, a set of routers and/or networking switches 926. In an example embodiment, the functionality hosted by the one or more physical servers 122 may include web or HTTP servers, FTP servers, as well as, without limitation, webpages and applications implemented using Common Gateway Interface (CGI) script, PHP Hypertext Preprocessor (PHP), Active Server Pages (ASP), HTML, XML, Java, JavaScript, Asynchronous JavaScript and XML (AJAX), Flash, ActionScript, and the like.

Physical servers 922 may host functionality directed to the operations of networking system 920. Hereinafter, servers 922 may be referred to as server 922, although server 922 may include numerous servers hosting, for example, networking system 920, as well as other content distribution servers, data stores, and databases. Data store 924 may store content and data relating to, and enabling, operation of networking system 920 as digital data objects. A data object, in particular embodiments, is an item of digital information typically stored or embodied in a data file, database, or record, Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, and the like. Logically, data store corresponds to one or more of a variety of separate and integrated databases, such as relational databases and object-oriented databases, that maintain information as an integrated collection of logically related records or files stored on one or more physical systems. Structurally, data store 924 may generally include one or more of a large class of data storage and management systems. In particular embodiments, data store 924 may be implemented by any suitable physical system(s) including components such as one or more database servers, mass storage media, media library systems, storage area networks, data storage clouds, and the like. In one example embodiment, data store 924 includes one or more servers, databases (e.g., MySQL), and/or data warehouses, Data store 924 may include data associated with different networking system 920 users and/or client systems 930.

Client system 930 is generally a computer or computing device including functionality for communicating (e.g., remotely) over a computer network. Client system 930 may be a desktop computer, laptop computer, personal digital assistant (PDA), in- or out-of-car navigation system, smart phone or other cellular or mobile phone, or mobile gaming device, among other suitable computing devices. Client system 930 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 930 to enter addresses of specific network resources to be retrieved, such as resources hosted by networking system 920. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is HTML. Other common web browser-supported languages and technologies include XML, the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 930 desires to view a particular webpage (hereinafter also referred to as target structured document) hosted by networking system 920, the user's web browser, or other document rendering engine or suitable client application, fomulates and transmits a request to networking system 920. The request generally includes a URL or other document identifier as well as metadata or other information. By way of example, the request may include information identifying the user, such as a user ID, as well as information identifying or characterizing the web browser or operating system running on the user's client system 930. The request may also include location information identifying a geographic location of the user's client system 930 or a logical network location of the user's client system 930. The request may also include a timestamp identifying when the request was transmitted.

Although the example network environment described above and illustrated in FIG. 9 is described with respect to social networking system 920*a* and game networking system 920*b*, this disclosure encompasses any suitable network environment using any suitable systems. As an example and not by way of limitation, the network environment may include online media systems, online reviewing systems, online search engines, online advertising systems, or any combination of two or more such systems.

Figure 10:
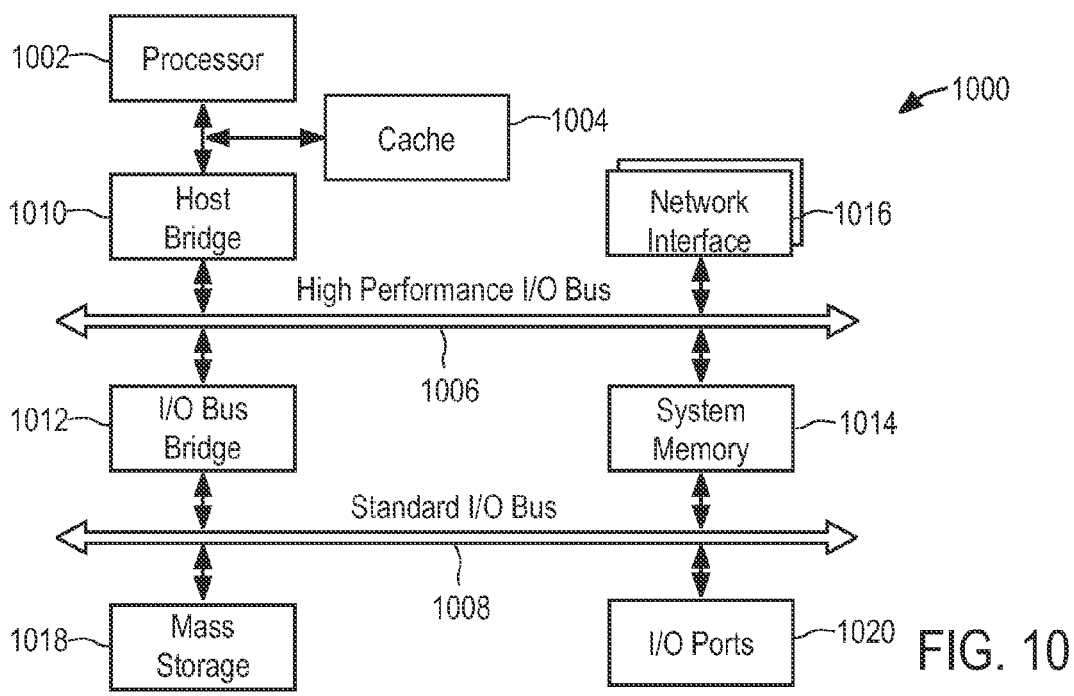
FIG. 10 illustrates an example of a computer system architecture.

FIG. 10 illustrates an example computing system architecture, which may be used to implement a server 922 or a client system 930. In one embodiment, hardware system 1000 comprises a processor 1002, a cache memory 1004, and one or more executable modules and drivers, stored on a tangible computer readable medium, directed to the functions described herein. Additionally, hardware system 1000 may include a high performance input/output (I/O) bus 1006 and a standard I/O bus 1008. A host bridge 1010 may couple processor 1002 to high performance I/O bus 1006, whereas I/O bus bridge 1012 couples the two buses 1006 and 1008 to each other. A system memory 1014 and one or more network/communication interfaces 1016 may couple to bus 1006. Hardware system 1000 may further include video memory (not shown) and a display device coupled to the video memory. Mass storage 1018 and I/O ports 1020 may couple to bus 1008. Hardware system 1000 may optionally include a keyboard, a pointing device, and a display device (not shown) coupled to bus 1008. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 1000 are described in greater detail below. In particular, network interface 1016 provides communication between hardware system 1000 and any of a wide range of networks, such as an Ethernet (e.g., IEEE 802.3) network, a backplane, and the like. Mass storage 1018 provides permanent storage for the data and programming instructions to perform the above-described functions implemented in servers 422, whereas system memory 1014 (e.g., DRAM) provides temporary storage for the data and programming instructions when executed by processor 1002. I/O ports 1020 are one or more serial and/or parallel communication ports that provide communication between additional peripheral devices, which may be coupled to hardware system 1000.

Hardware system 1000 may include a variety of system architectures, and various components of hardware system 1000 may be rearranged. For example, cache 1004 may be on-chip with processor 1002. Alternatively, cache 1004 and processor 1002 may be packed together as a "processor module," with processor 1002 being referred to as the "processor core." Furthermore, certain embodiments of the present disclosure may not require nor include all of the above components. For example, the peripheral devices shown coupled to standard I/O bus 1008 may couple to high performance I/O bus 1006. In addition, in some embodiments, only a single bus may exist, with the components of hardware system 1000 being coupled to the single bus. Furthermore, hardware system 1000 may include additional components, such as additional processors, storage devices, or memories.

An operating system manages and controls the operation of hardware system 1000, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit.

Figure 11:
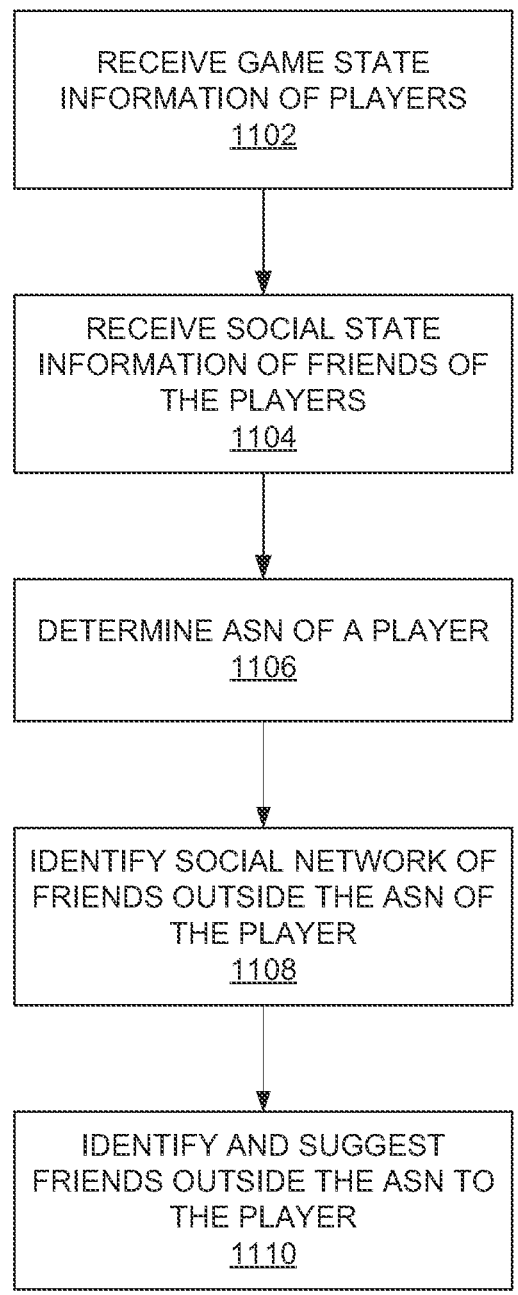
FIG. 11 is a flow diagram illustrating one example embodiment of a method for an ASN engine.

FIG. 11 is a flow diagram illustrating one embodiment of a method for an ASN engine. At 1102, game state information of players is received from a game networking system. At 1104, social state information of friends of the players is received from a social networking system. At 1106, an ASN of a player is determined based on the game state information of players and the social state information of friends of the players. The ASN comprises friends of the player having a minimum predefined number of closed-loop communications with the player within a predetermined duration. At 1108, a social network of friends outside the ASN of the player is identified. At 1110, one or more friends are identified and suggested to the player to socially engage with the player in an online game based on the social network of friends of the player outside the ASN of the player.

Figure 12:
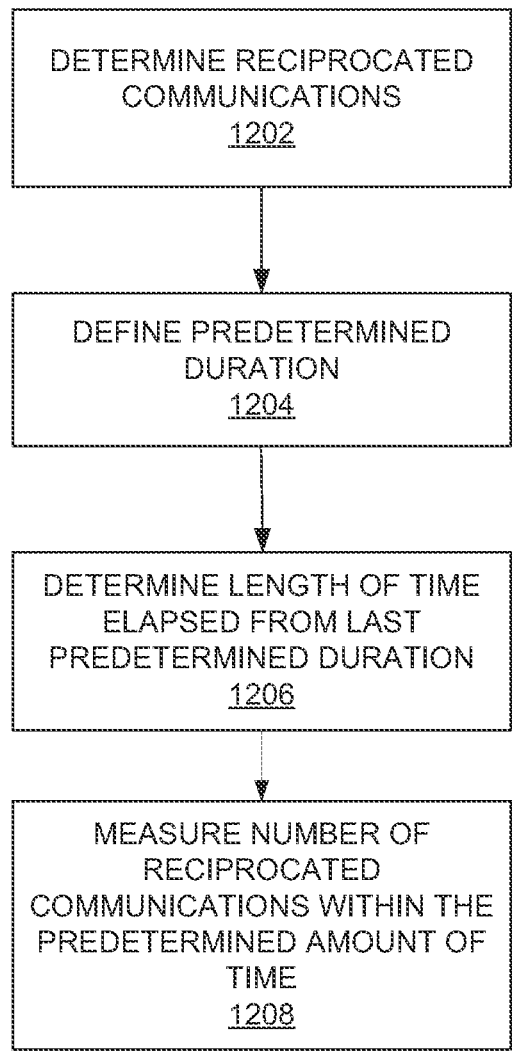
FIG. 12 is a flow diagram illustrating one example embodiment of a method for determining an ASN of a player.

FIG. 12 is a flow diagram illustrating one embodiment of a method for a determining an ASN of a player. At 1202, reciprocated communications between the player and respective friends of the player within the predetermined duration are determined. At 1204, the predetermined duration is defined. At 1206, the length of time elapsed from a last predetermined duration is determined. At 1208, a number of reciprocated communications between the player and respective friends of the player within the predetermined duration is measured.

Figure 13:
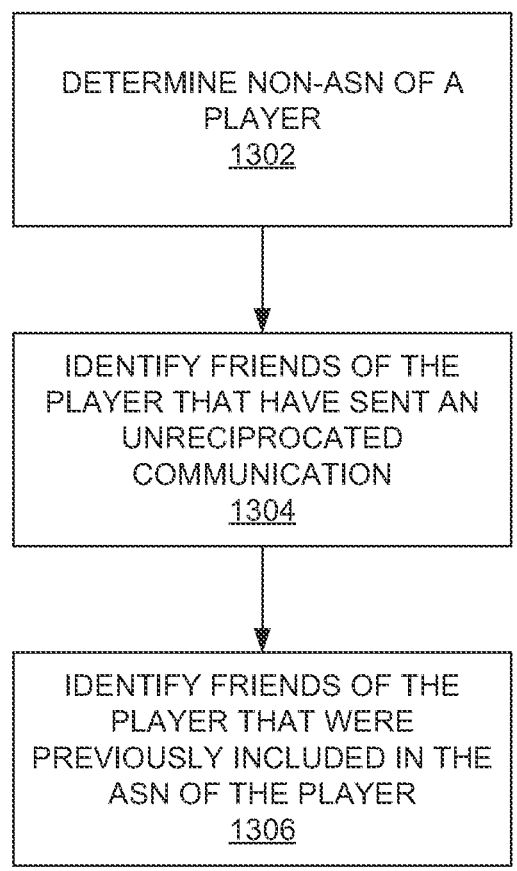
FIG. 13 is a flow diagram illustrating one example embodiment of a method for a non-ASN sender engine.

FIG. 13 is a flow diagram illustrating one embodiment of a method for a non-ASN sender engine. At 1302, a non-ASN sender network of the player is determined based on the ASN of the player. The non-ASN sender network comprises friends of the player who have sent an unreciprocated communication to the player within a predetermined amount of time. At 1304, friends of the player who have sent an unreciprocated communication to the player within the predetermined amount of time are identified. At 1306, friends of the player who were previously included in the ASN of the player and have sent an unreciprocated communication to the player within the predetermined amount of time are identified.

Figure 14:
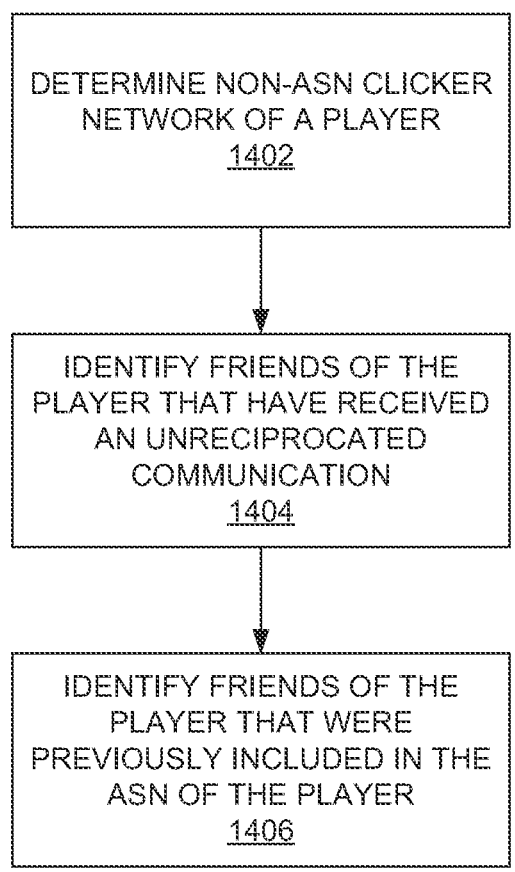
FIG. 14 is a flow diagram illustrating one embodiment of a method for a non-ASN clicker engine.

FIG. 14 is a flow diagram illustrating one embodiment of a method for a non-ASN clicker engine. At 1402, a non-ASN clicker network of the player is determined based on the ASN of the player. The non-ASN clicker network comprises friends of the player who have received an unreciprocated communication from the player within a predetermined amount of time. At 1404, friends of the player who have received an unreciprocated communication from the player within the predetemnined amount of time are identified. At 1406, friends of the player who were previously included in the ASN of the player and have received an unreciprocated communication from the player within the predetermined amount of time are identified.

Figure 15:
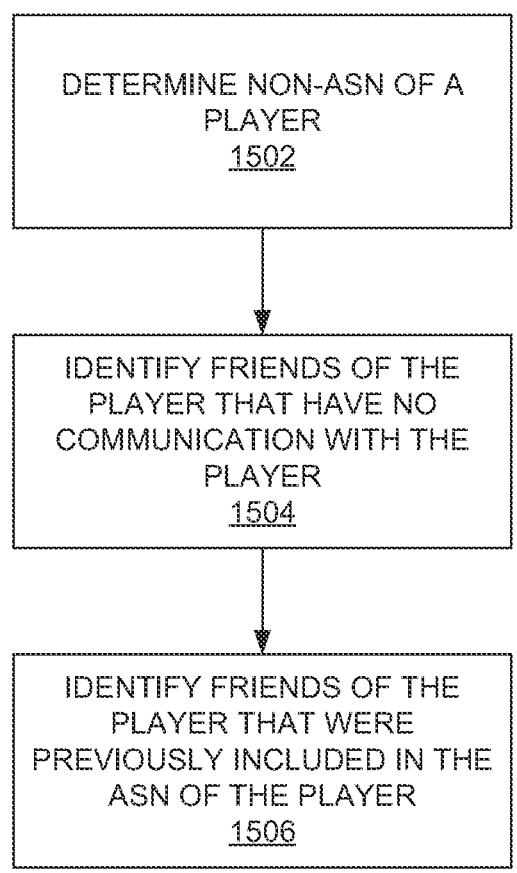
FIG. 15 is a flow diagram illustrating one embodiment of a method for a non-ASN friend engine.

FIG. 15 is a flow diagram illustrating one embodiment of a method for a non-ASN friend engine. At 1502, the non-ASN of the player of the online game is determined based on the ASN of the player of the online game. The non-ASN comprises friends of the player who have no communications with the player within a predetermined amount of time. At 1504, friends of the player who have no communications with the player within the predetermined amount of time are identified. At 1506, friends of the player who were previously included in the ASN of the player and have no communications with the player within the predetermined amount of time are identified.

Café World Example

Café World is an online game from Zynga Inc., a California-based company. A friend recommendation feature may show to a player which of his/her friends have been playing Café (and what they have been doing in the game) and prompts the player to send gifts to these friends in an effort to increase the player's ASN size.

Catering Orders are fairly similar to Farm's co-op feature: one gets a catering order where one has to cook x amount of a few different dishes and also collect items from friends. Collecting the items is request-based and one can also ask his/her friends to join his/her catering crew, so the whole feature is request based and viral. The feature helps increase ASN size for users. Users add each other to their crew by sending requests through the friend recommendation feature.

Miscellaneous

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

One or more features from any embodiment may be combined with one or more features of any other embodiment without departing from the scope of the disclosure.

A recitation of "a," "an," or "the" is intended to mean "one or more" unless specifically indicated to the contrary. In addition, it is to be understood that functional operations, such as "awarding," "locating," "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, PDA, personal gaming device, etc.), that makes API calls directly to a server. Still further, while the embodiments described above operate with business-related virtual objects (such as stores and restaurants), the disclosure can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method comprising:
accessing information of a social network of a player of a computer-implemented game;
determining a frequency of reciprocated communications within an elapsed time between the player and other players from the social network of the player, each one of the reciprocated communications comprising both of:
a first message sent from a first player to a second player, and
a second message sent from the second player to the first player, the second message replying to the first message;
identifying one or more active players from the social network of the player based on the frequency of the reciprocated communications within the elapsed time;
determining an active social network of the player from the one or more active players;
identifying one or more non-active players from the social network of the player outside the active social network of the player;
identifying one or more below-threshold non-active players, each of which is a non-active player with a number of reciprocated communications with the player within the elapsed time below a threshold value;
identifying one or more unreciprocated non-active players, each of which is a non-active player with at least one unreciprocated communication with the player within the elapsed time;
identifying one or more previously active non-active players, each of which is a non-active player who was previously included in the active social network of the player; and
analyzing, using at least one processor of a machine, social interaction of the player with other players from the information of the social network of the player to identify one or more recommended players from the social network of the player to further communicate with, the analyzing being based at least in part on a frequency of the social interaction, the frequency of the reciprocated communications, the one or more below-threshold non-active players, the one or more unreciprocated non-active players, and the one or more previously active non-active players;
generating a recommendation of the one or more recommended players to the player based on the analyzing;
receiving from the player a selection of one or more selected players from the one or more recommended players; and
generating a communication message to the one or more selected players.

2. The computer-implemented method of claim 1, further comprising:
determining how recent a reciprocated communication between the player and another player from the social network of the player by measuring a length of time elapsed since a last reciprocated communication between the player and another player from the social network.

3. The computer-implemented method of claim 1, wherein the one or more recommended players comprises the one or more non-active players.

4. The computer-implemented method of claim 1, further comprising:
determining the active social network of the player for the computer-implemented game; and
identifying a social network of the player outside the active social network of the player for another computer-implemented game.

5. The computer-implemented method of claim 1, wherein the communication message comprises an invitation to join the player in the computer-implemented game, an offer of a virtual gift to be redeemed by a recipient of the communication message in the computer-implemented game, or an offer of a reward to be redeemed by the recipient of the communication message.

6. A non-transitory computer-readable storage medium storing a set of instructions that, when executed by a processor, cause the processor to perform operations, comprising:
accessing information of a social network of a player of a computer-implemented game;
determining a frequency of reciprocated communications within an elapsed time between the player and other players from the social network of the player, each one of the reciprocated communications comprising both of:
a first message sent from a first player to a second player, and
a second message sent from the second player to the first player, the second message replying to the first message;
identifying one or more active players from the social network of the player based on the frequency of the reciprocated communications within the elapsed time;
determining an active social network of the player from the one or more active players;
identifying one or more non-active players from the social network of the player outside the active social network of the player;
identifying one or more below-threshold non-active players, each of which is a non-active player with a number of reciprocated communications with the player within the elapsed time below a threshold value;
identifying one or more unreciprocated non-active players, each of which is a non-active player with at least one unreciprocated communication with the player within the elapsed time;
identifying one or more previously active non-active players, each of which is a non-active player who was previously included in the active social network of the player; and
analyzing social interaction of the player with other players from the information of the social network of the player to identify one or more recommended players from the social network of the player to further communicate with, the analyzing being based at least in part on a frequency of the social interaction, the frequency of the reciprocated communications, the one or more below-threshold non-active players, the one or more unreciprocated non-active players, and the one or more previously active non-active players;
generating a recommendation of the one or more recommended players to the player based on the analyzing;
receiving from the player a selection of one or more selected players from the one or more recommended players; and
generating a communication message to the one or more selected players.

7. The non-transitory computer-readable storage medium of claim 6, further comprising:

determining how recent a reciprocated communication between the player and another player from the social network of the player by measuring a length of time elapsed since a last reciprocated communication between the player and another player from the social network.

8. The non-transitory computer-readable storage medium of claim 6, wherein the one or more recommended players comprises the one or more non-active players.

9. A system comprising:
at least one processor of a machine;
an active social network module that comprises the at least one processor and that is configured to:
  access information of a social network of a player of a computer-implemented game,
  determine a frequency of reciprocated communications within an elapsed time between the player and other players from the social network of the player, each one of the reciprocated communications comprising both of:
    a first message sent from a first player to a second player, and
    a second message sent from the second player to the first player, the second message replying to the first message;
  identify one or more active players from the social network of the player based on the frequency of the reciprocated communications within the elapsed time;
  determining an active social network of the player from the one or more active players;
  identified one or more non-active players from the social network of the player outside the active social network of the player;
  identify one or more below-threshold non-active players, each of which is a non-active player with a number of reciprocated communications with the player within the elapsed time below a threshold value;
  identify one or more unreciprocated non-active players, each of which is a non-active player with at least one unreciprocated communication with the player within the elapsed time;
  identify one or more previously active non-active players, each of which is a non-active player who was previously included in the active social network of the player; and
  perform an analysis of social interaction of the player with other players from the information of the social network of the player to identify one or more recommended players from the social network of the player to further communicate with, the analysis being based at least in part on a frequency of the social interaction, the frequency of the reciprocated communications, the one or more below-threshold non-active players, the one or more unreciprocated non-active players, and the one or more previously active non-active players;
a recommendation module configured to generate a recommendation of the one or more recommended players to the player based on the analysis; and
a messaging module configured to:
  receive from the player a selection of one or more selected players from the one or more recommended players, and
  generate a communication message to the one or more selected players.

10. The system of claim 9, wherein the active social network module is further configured to:
determine how recent a reciprocated communication between the player and another player from the social network of the player by measuring a length of time elapsed since a last reciprocated communication between the player and another player from the social network.

11. The system of claim 9, wherein the one or more recommended players comprises the one or more non-active players.

12. The system of claim 9, wherein the active social network module is further configured to:
determine an active social network of the player for the computer-implemented game; and
identify a social network of the player outside the active social network of the player for another computer-implemented game.

13. The system of claim 9, wherein the communication message comprises an invitation to join the player in the computer-implemented game, an offer of a virtual gift to be redeemed by a recipient of the communication message in the computer-implemented game, or an offer of a reward to be redeemed by the recipient of the communication message.

* * * * *

UNITED STATES PATENT AND TRADEMARK OFFICE
CERTIFICATE OF CORRECTION

| | | |
|---|---|---|
| PATENT NO. | : 8,943,133 B2 | |
| APPLICATION NO. | : 13/244840 | |
| DATED | : January 27, 2015 | |
| INVENTOR(S) | : McCaffrey et al. | |

It is certified that error appears in the above-identified patent and that said Letters Patent is hereby corrected as shown below:

In The Specification

In column 2, line 19, delete "my" and insert --may--, therefor

In column 2, line 52-53, delete "anon-ASN" and insert --a non-ASN--, therefor

In column 3, line 17, delete "anon-ASN" and insert --a non-ASN--, therefor

In column 3, line 42, delete "extranet," and insert --an extranet,--, therefor

In column 3, line 66, delete "1201)" and insert --120b--, therefor

In column 4, line 23, delete "my" and insert --may--, therefor

In column 4, line 27, delete "interface" and insert --Interface--, therefor

In column 4, line 33, delete "VPN," and insert --a VPN,--, therefor

In column 4, line 33, delete "a WEAN," and insert --a WLAN,--, therefor

In column 4, line 49, delete "1201)," and insert --120b,--, therefor

In column 5, line 35, delete "sys" and insert --system--, therefor

In column 5, line 55, delete "player," and insert --player--, therefor

In column 6, line 14, delete "Objects" and insert --objects--, therefor

In column 7, line 18, delete "for" and insert --(or--, therefor

In column 8, line 35, delete "asocial" and insert --a social--, therefor

In column 9, line 19, before "236", delete "to", therefor

Signed and Sealed this
Thirtieth Day of June, 2015

Michelle K. Lee
*Director of the United States Patent and Trademark Office*

CERTIFICATE OF CORRECTION (continued)
U.S. Pat. No. 8,943,133 B2

In column 10, line 8, delete "art" and insert --an--, therefor

In column 10, line 36, delete "I-ITTP" and insert --HTTP--, therefor

In column 10, line 62, delete "HTITP-S," and insert --HTTP-S,--, therefor

In column 17, line 16, delete "122" and insert --922--, therefor

In column 17, line 32, delete "record," and insert --record.--, therefor

In column 17, line 39, after "store", insert --924--, therefor

In column 17, line 52, delete "warehouses," and insert --warehouses.--, therefor In column 18, line 36, delete "fomulates" and insert --formulates--, therefor In column 20, line 36, delete "predetemnined" and insert --predetermined--, therefor